(12) United States Patent
Iacaruso et al.

(10) Patent No.: US 11,360,870 B2
(45) Date of Patent: Jun. 14, 2022

(54) FUNCTIONAL SAFETY COMPLIANT SELF-TESTING

(71) Applicant: Intel Corporation, Santa Clara, CA (US)

(72) Inventors: Maurizio Iacaruso, Celenza Valfortore (IT); Gabriele Paoloni, Pisa (IT)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 16/830,325

(22) Filed: Mar. 26, 2020

(65) Prior Publication Data

US 2020/0241987 A1 Jul. 30, 2020

(51) Int. Cl.
| | |
|---|---|
| *G06F 11/27* | (2006.01) |
| *G06F 11/07* | (2006.01) |
| *G06F 11/10* | (2006.01) |
| *G06F 21/60* | (2013.01) |
| *G06F 21/44* | (2013.01) |

(52) U.S. Cl.
CPC .......... *G06F 11/27* (2013.01); *G06F 11/0739* (2013.01); *G06F 11/0754* (2013.01); *G06F 11/1004* (2013.01); *G06F 21/44* (2013.01); *G06F 21/602* (2013.01); *G06F 2201/81* (2013.01)

(58) Field of Classification Search
CPC .. G06F 11/27; G06F 11/0754; G06F 11/1004; G06F 21/602; G06F 11/0739; G06F 21/44; G06F 2201/81; G06F 21/51; G06F 21/575; G06F 11/3696; G06F 11/3668
USPC .......................................................... 714/733
See application file for complete search history.

(56) References Cited

U.S. PATENT DOCUMENTS

| | | | | |
|---|---|---|---|---|
| 2011/0231716 | A1* | 9/2011 | Prakash | G11C 29/12 714/E11.169 |
| 2017/0293541 | A1* | 10/2017 | Venu | G06F 11/0766 |
| 2018/0145041 | A1* | 5/2018 | Fkih | G06F 11/27 |
| 2018/0231609 | A1* | 8/2018 | Jain | G06F 11/36 |
| 2019/0042480 | A1* | 2/2019 | Khatib Zadeh | G11C 29/44 |
| 2019/0138408 | A1* | 5/2019 | Menon | G06F 11/27 |
| 2019/0278677 | A1* | 9/2019 | Terechko | G06F 11/2242 |

* cited by examiner

*Primary Examiner* — James C Kerveros
(74) *Attorney, Agent, or Firm* — Viering, Jentschura & Partner mbB

(57) ABSTRACT

A self-test verification device may include one or more first processors, configured to generate an instruction for one or more second processors to perform one or more device self-tests; determine for a received result of the one or more device self-tests, whether the result fulfills a predetermined receive time criterion describing an acceptable time until the result should have been received; determine a difference between the received result and a target result; and if the predefined receive time criterion is fulfilled and if the difference between the received result and the target result is within a predetermined range, generate a signal representing a passed self-test.

21 Claims, 7 Drawing Sheets

602

702

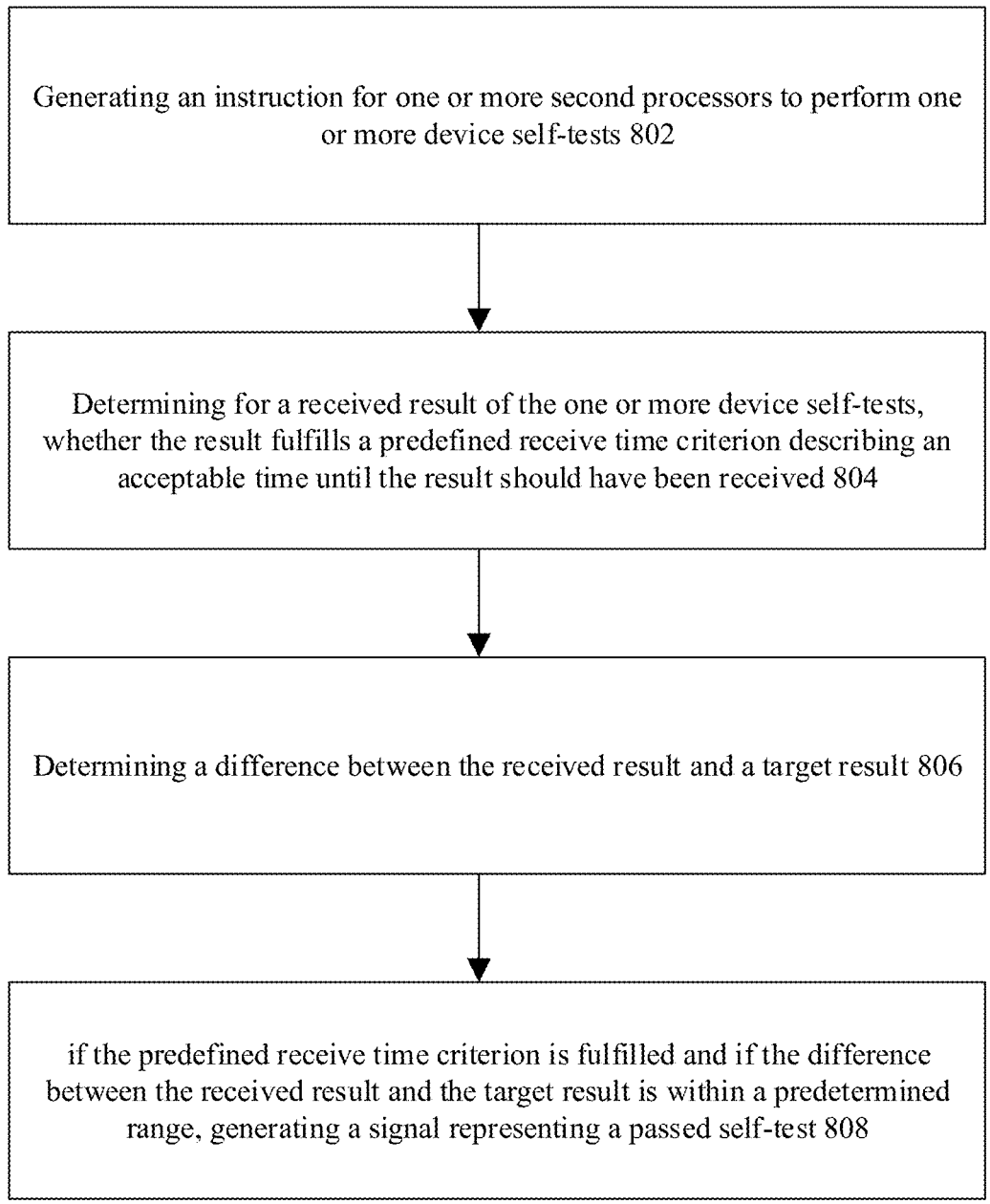

FUNCTIONAL SAFETY COMPLIANT SELF-TESTING

TECHNICAL FIELD

Various aspects of this disclosure generally relate to the use of legacy self-testing systems to meet Functional Safety Standards.

BACKGROUND

Autonomous Driving (AD) utilizes reliable driving safety systems that process detected data of the environment of an autonomous vehicle (AV) to implement a driving policy of the autonomous vehicle (AV). It may be desired or required for an AV to meet the requirements of one or more safety standards, such as one or more Functional Safety Standards. Among other requirements, Functional Safety Standards may require one or more components of an AV to perform a self-test. Functional Safety Standards may demand strict adherence to certain test parameters, such as, for example, a completion of the test within a particular time duration. It may further be necessary to demonstrate that testing circuits exhibit certain levels of independence and/or resistance to tampering.

One challenge for Functional Safety products is the re-usage of legacy debug infrastructure to accomplish the hardware self-test requirements essential to meet a desired safety standards, such as, e.g., the target Safety Integrity level. As safety standards evolve, new requirements may be issued, and legacy components may not be equipped to meet certain new requirements of the new safety standards.

Efforts to satisfy the requirements of modern Functional Safety Standards have generally involved either redesigning legacy components (e.g., hardware, firmware, and/or software) to independently satisfy the Functional Safety Standards, or applying qualification methods from the standards to produce Functional Safety deliverables such as Safety Analysis, documentation evidences, verification and validation reports. Each of these strategies may be costly and thus undesirable or impractical. Moreover, such hardware self-tests are often implemented through multiple legacy components, which can sometimes preclude retroactive adjustment to meet a current Functional Safety Standard.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 8 depicts a method of self-test verification.

DESCRIPTION

Figure 1:
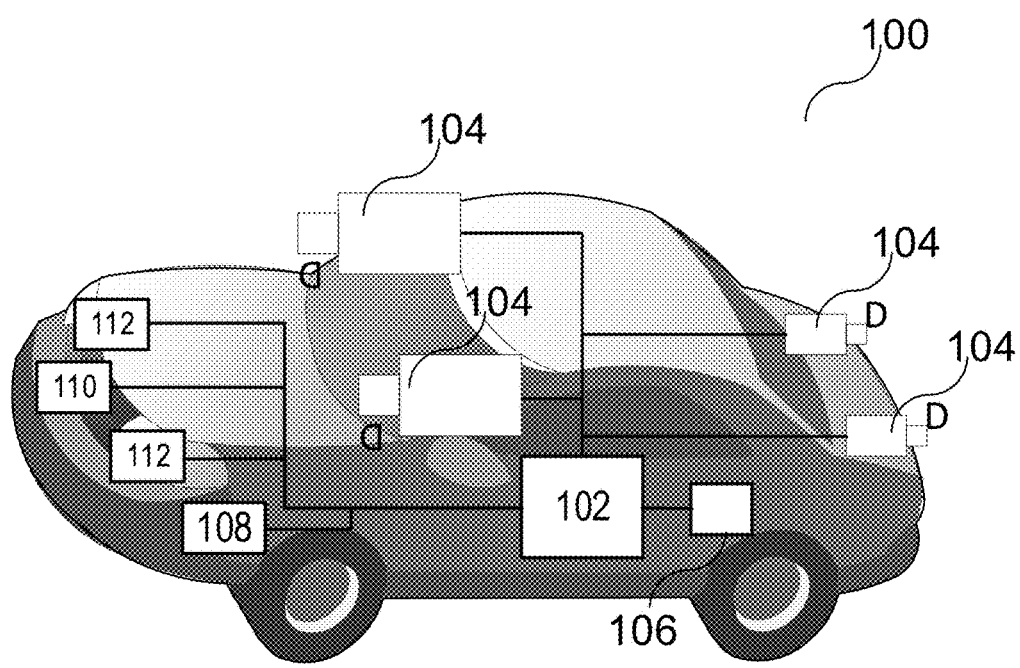
FIG. 1 depicts an exemplary autonomous vehicle in accordance with various aspects of the present disclosure.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

A safety integrity level may reference to a level of risk or risk-reduction provided by a safety function. A safety integrity level may be determined as part of a risk analysis, in which a risk associated with a given hazard is calculated and then compared to a risk of that hazard upon implementation of a risk reduction strategy. The safety integrity level may be selected according to one or more standards.

FIG. 1 shows an exemplary vehicle, namely vehicle 100, in accordance with various aspects of the present disclosure. In some aspects, vehicle 100 may include one or more processors 102, one or more image acquisition devices 104, one or more position sensors 106, one or more speed sensors 108, one or more radar sensors 110, and/or one or more LIDAR sensors 112.

In some aspects, vehicle 100 may include a safety system 200 (as described with respect to FIG. 2 below). It is appreciated that vehicle 100 and safety system 200 are exemplary in nature and may thus be simplified for explanatory purposes. Locations of elements and relational distances (as discussed above, the figures are not to scale) are provided as examples and are not limited thereto. The safety system 200 may include various components depending on the requirements of a particular implementation.

Figure 2:
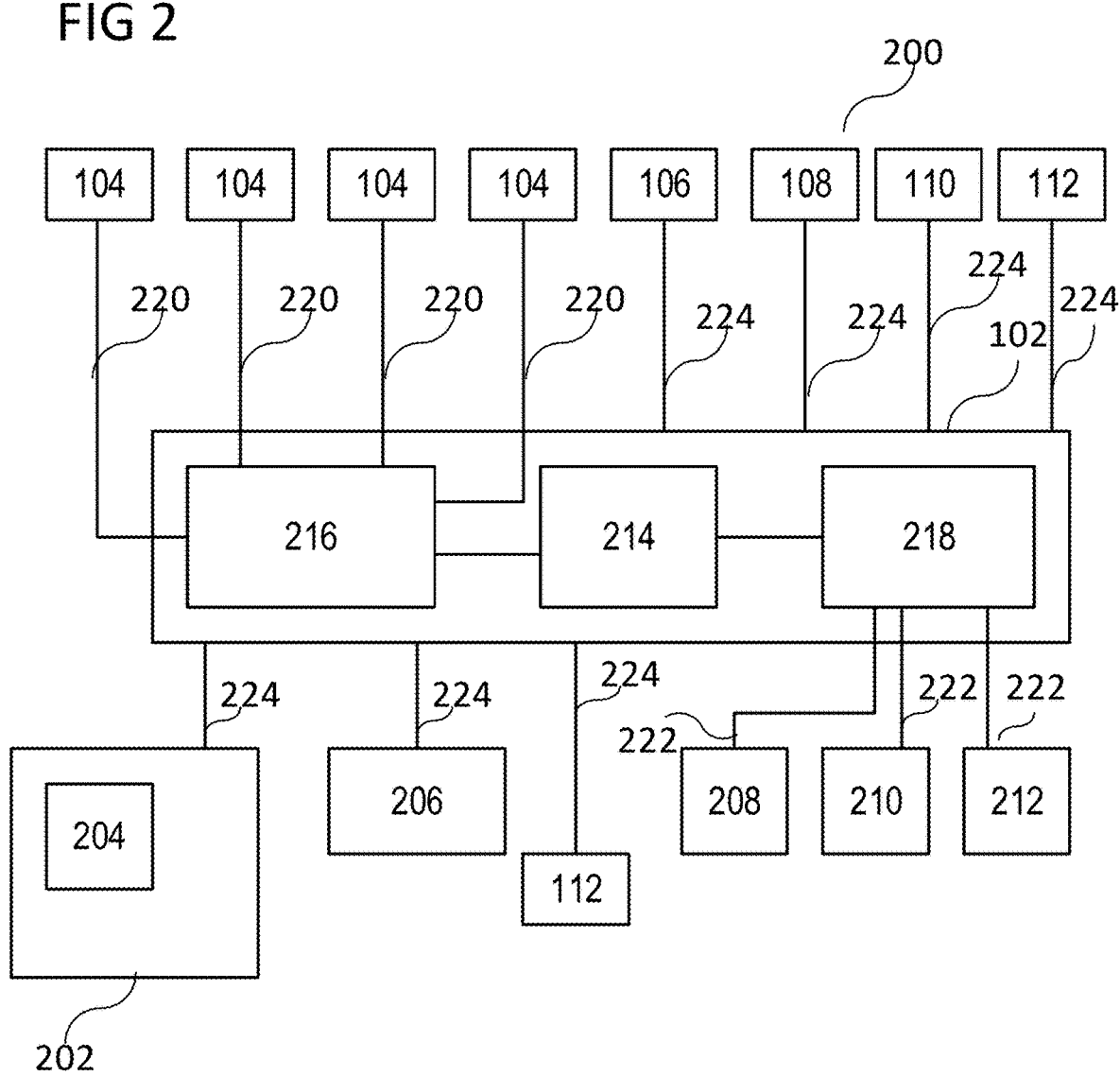
FIG. 2 depicts various exemplary electronic components of a safety system of the vehicle in accordance with various aspects of the present disclosure.

FIG. 2 shows various exemplary electronic components of a vehicle, namely safety system 200, in accordance with various aspects of the present disclosure. In some aspects, the safety system 200 may include one or more processors 102, one or more image acquisition devices 104 (e.g., one or more cameras), one or more position sensors 106 (e.g., for a Global Navigation Satellite System (GNSS), for a Global Positioning System (GPS), etc.), one or more speed sensors 108, one or more radar sensors 110, and/or one or more LIDAR sensors 112. According to at least one aspect, safety system 200 may further include one or more memories 202, one or more map databases 204, one or more user interfaces 206 (e.g., a display, a touch screen, a microphone, a loudspeaker, one or more buttons and/or switches, etc.), and/or one or more wireless transceivers 208, 210, 212. The wireless transceivers 208, 210, 212 may, in some aspects, be configured according to the same, different, or any combination thereof radio communication protocols or standards.

In some aspects, the one or more processors 102 may include an application processor 214, an image processor 216, a communication processor 218, and/or any other suitable processing device. Image acquisition device(s) 104 may include any number of image acquisition devices and components depending on the requirements of a particular application. Image acquisition devices 104 may include one or more image capture devices (e.g., cameras, CCDs (charge coupling devices), or any other type of image sensor).

In at least one aspect, the safety system 200 may also include a data interface communicatively connecting the one or more processors 102 to the one or more image acquisition devices 104. For example, a first data interface may include any wired and/or wireless first link 220 or first links 220 configured to transmit image data acquired by the one or more image acquisition devices 104 to the one or more processors 102 (e.g., to the image processor 216).

The wireless transceivers 208, 210, 212 may, in some aspects, be coupled to the one or more processors 102 (e.g., to the communication processor 218) via, for example a second data interface. The second data interface may include any wired and/or wireless second link 222 or second links 222 configured to transmit radio transmitted data acquired by wireless transceivers 208, 210, 212 to the one or more processors 102, e.g., to the communication processor 218.

In some aspects, the memories 202 as well as the one or more user interfaces 206 may be coupled to each of the one or more processors 102, e.g., via a third data interface. The third data interface may include any wired and/or wireless third link 224 or third links 224. Furthermore, the position sensor 106 may be coupled to each of the one or more processors 102, e.g., via the third data interface.

Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when executed by a processor (e.g., by the one or more processors 102), controls the operation of the system, e.g., the safety system. A memory of the one or more memories 202 may store one or more databases and image processing software, as well as a trained system, such as a neural network, or a deep neural network, for example. The one or more memories 202 may include any number of random access memories, read only memories, flash memories, disk drives, optical storage, tape storage, removable storage and other types of storage.

In some aspects, the safety system 200 may further include components such as a speed sensor 108 (e.g., a speedometer) for measuring a speed of the vehicle 100. The safety system may also include one or more accelerometers (either single axis or multiaxis) (not shown) for measuring accelerations of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), and the like. The radar sensors 110 and/or the LIDAR sensors 112 may be configured to provide pre-processed sensor data, such as radar target lists or LIDAR target lists. The third data interface may couple the speed sensor 108, the one or more radar sensors 110 and the one or more LIDAR sensors 112 to at least one of the one or more processors 102.

The one or more memories 202 may store data, e.g., in a database or in any different format, that, e.g., indicate a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database 204 may include any type of database storing (digital) map data for the vehicle 100, e.g., for the safety system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In such aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

As described above, the vehicle 100 may include the safety system 200 as also described with reference to FIG. 2.

The vehicle 100 may include the one or more processors 102 e.g. integrated with or separate from an engine control unit (ECU) of the vehicle 100.

The safety system 200 may in general generate data to control or assist to control the ECU and/or other components of the vehicle 100 to directly or indirectly control the driving of the vehicle 100.

Although the following aspects will be described in association with the safety driving model, any other driving model may be provided in alternative implementations.

The one or more processors 102 of the vehicle 100 may implement the following aspects and methods.

It may be desired for one or more vehicle components to demonstrate compliance with one or more Functional Safety Requirements. Broadly speaking, Functional Safety may refer to an ability of a component designed to provide a level of automatic protection to operate correctly in response to its inputs. A functional safety system may carry out each of a plurality of specified safety functions and perform each specified safety function to a required level of performance. Generally, this may include a review of the relevant hazards and safety functions; assessment of a risk reduction required by a safety function, which may include attaining a safety integrity level; ensuring that a safety function performs according to its design and intent; verifying that the system meets the assigned safety integrity level; and/or conducting functional safety audits.

Functional safety may be standardized and certified according to compliance with one or more standards. For example, the International Electrotechnical Commission (IEC) has promulgated IEC 61508 ("Functional Safety Of Electrical/Electronic/Programmable Electronic Safety-Related Systems (E/E/PE, or E/E/PES)"), IEC 61508:2010 v2.0, which defines certain Functional Safety Standards across a variety of technical disciplines. Moreover, in the automotive industry, the International Organization for Standardization (ISO) has promulgated safety standards, which are codified in ISO 26262-1:2018 ("Road vehicles—Functional Safety). According to an aspect of the disclosure, attaining a desired level of functional safety may correspond with satisfaction of one or more requirements of IEC 61508: 2010 v2.0 and/or IEC 61508 ISO 26262-1:2018. These standards notwithstanding, the principles, devices, and/or methods disclosed herein may be implemented to attain a functional safety level from any source. The attained functional safety level may be based on compliance with any standard, whether published or unpublished. Said standards may arise out of IEC 61508:2010 v2.0, ISO 26262-1:2018, or otherwise; however, nothing in this disclosure should be understood as limiting the principles, devices, and/or methods disclosed herein to compliance with IEC 61508:2010 v2.0 and/or ISO 26262-1:2018.

Many vehicle components are designed to satisfy the functional safety requirements of promulgated standards. As new standards are released, however, vehicle components that predate the release of said standards (e.g., legacy components) may be unable to satisfy the requirements of the new standards. Furthermore, because Functional Safety Standards are not expressly limited to those standards which are published, but rather may include any desired standard to achieve functional safety, a given Functional Safety Standard to be implemented may not correspond to the capabilities of a given vehicle component. Otherwise stated, existing vehicle components, without further assistance, may not be able to satisfy the requirements of a given Functional Safety Standard.

As new Functional Safety Standards are developed/released/promulgated, and as existing or legacy components are determined to be unable to satisfy the requirements of the new Functional Safety Standards, additional steps should generally be taken to satisfy the Functional Safety Standards. One strategy for satisfying the Functional Safety Standards has been to develop new components. Such development of new components may be costly and time-consuming, thereby significantly increasing vehicle cost and time-to-market. Qualification methods may conventionally be applied from standards to produce Functional Safety deliverables such as Safety Analysis, documentation evidences, verification and validation reports; however, these procedures are cumbersome and often result in significant additional expense.

In light of these disadvantages, it may be desirable to develop a procedure for reusing legacy components to satisfy one or more Functional Safety Requirements. Although the principles and methods described herein may be generally applied to many different functional safety aspects and component types, specific attention will be directed to functional safety as it corresponds to testing systems on chips. This notwithstanding, the principles and methods disclosed herein can be broadly applied to a variety of circumstances and should not be understood to be limited to a system on chip.

A system on chip (SOC) may be generally understood as an integrated circuit that integrates multiple components of a computer or electronic system. An SOC may include at least one or more processors (i.e. one or more central processing units), one or more memory devices, one or more input/output ports, and/or one or more secondary storage devices. A vehicle may include one or more SOCs. One or more Functional Safety Standards may require one or more self-tests of the SOCs. Such one or more self-tests may have to meet one or more requirements (e.g., timing, accuracy, etc.) to satisfy a Functional Safety Standard.

Attention is now turned to performing Functional Safety Standard compliant self-tests (e.g. on a SOC) using legacy components. According to an aspect of the disclosure, a Functional Safety compliant Safety Monitor may permit Functional Safety compliant self-tests to be performed with legacy components. The safety monitor may be configured with expected results of one or more self-tests of one or more other components. One or more devices may perform the requisite safety tests, and the one or more devices may send the results of the safety tests to the safety monitor. One or more end-to-end communication protocols may encrypt this communication with the safety monitor. Because the safety monitor knows the expected self-test results, the safety monitor may compare the received test results with the expected self-test results and, at least on the basis of the comparison, determine a pass result or a fail result of the one or more self-tests.

Implementation of such a safety monitor to monitor and evaluate test results may be less costly than modifying existing (e.g. legacy) devices. Furthermore, the safety monitor may be less costly than applying qualification methods from standards to produce Functional Safety deliverables such as Safety Analysis, documentation evidences, verification and validation reports. Moreover, re-use of legacy components to execute self-tests may avoid the need to redesign said components and therefore reduce time-to-market.

According to an aspect of the disclosure, legacy components may satisfy functional safety requirements by utilizing: (1) an internal early boot IP (referred to herein as Orchestrator IP), which may be configured to orchestrate hardware self-tests developed without Safety Integrity Level claims; and (2) an independent Safety Monitor IP, which may be configured to have bidirectional communication capabilities with the Orchestrator IP. The Safety Monitor may be configured to perform any, or any combination, of the following roles in the self-test: (a) triggering the self-test flow by using GPIO PIN; (b) setting a watchdog timer to monitor the overall self-test flow by timeouts over the arrival of messages on the E2E interface; (c) storing expected results for the list of tests to be executed; (d) comparing the expected results with the ones received over the E2E interface; and/or (e) storing the received results and/or the comparison of the received results to the expected results. The Safety Monitor may be independent of any software, firmware, or hardware involved in the execution of the self-test.

According to one aspect of the Disclosure, The Orchestrator IP and the Safety Monitor may be connected via at least one input/output interface to permit bi-directional communication. The Orchestrator IP and the Safety Monitor may communicate by means of one or more end-to-end protocols. Said one or more end-to-end protocols may, for example, include a protocol developed according to, or to satisfy, one or more Functional Safety Standards.

Many Functional Safety Standards, including but not limited to IEC 61508:2010 v2.0 and/or IEC 61508 ISO 26262-1:2018, require self-tests to test for hidden and/or latent hardware faults. Such self-tests may be mandatory for a given Functional Safety Standard. According to one aspect of the disclosure, such self-tests may be developed and validated according to a Safety Integrity Level. The following description discusses the overall self-test flow in terms of a plurality of sub-flows; however, the resulting test(s) may be designed and/or carried out in such a manner that they may satisfy a relevant Safety Integrity Level and/or a relevant Functional Safety Standard.

Attention will first be drawn to the Orchestrator IP. In this Disclosure, IP may be broadly understood as a semiconductor core or integrated circuit, without limitation as to its format, design, or manufacturer. According to one aspect of the Disclosure, the Orchestrator IP may be an early boot IP that is responsible for loading a signed Network Tap (TAP) script from external memory; running the tests corresponding to the signed TAP script; and/or sending the test results to the Safety Monitor. The Orchestrator IP may operate self-tests as a black box and may send the test results to the Safety Monitor using one or more end-to-end message structures and/or communication protocols. The Orchestrator IP may conduct a series of hardware self-tests that are selected to meet one or more Functional Safety Standards. This may permit a legacy TAP infrastructure to run debug commands and remain accessible for the Orchestrator IP firmware within a functional safety context.

The Orchestrator IP may report test results to the Safety Monitor. The Safety Monitor may be configured as an independent Functional Safety compliant software/firmware/or hardware IP that may enable the self-test mode and/or monitor the overall self-test execution. The safety monitor may perform said monitoring of the overall self-test execution at least by setting a watchdog timer and comparing the results received from the Orchestrator IP with one or more expected results.

According to another aspect of the Disclosure, the Orchestrator IP and/or the Safety Monitor may utilize one or more black channel communication protocols (e.g., including, but not limited to, protocols that may be compliant with IEC 61508:2010 v2.0 and/or IEC 61508 ISO 26262-1:2018) to protect the integrity of the self-test results and/or any communication sent by the Orchestrator IP to the Safety Monitor.

Figure 3:
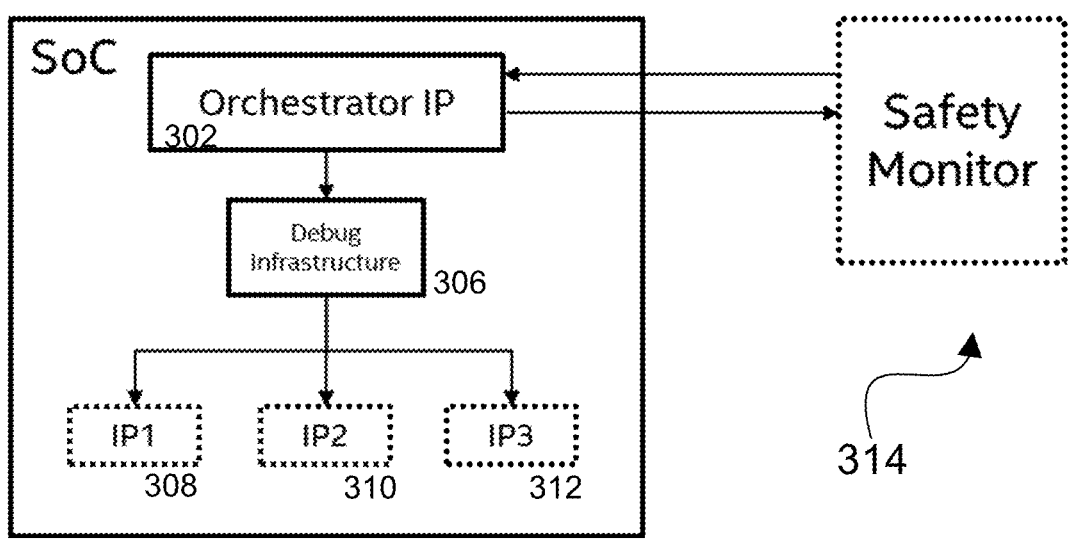
FIG. 3 depicts a component diagram including an Orchestrator IP and a Safety Monitor.

FIG. 3 shows a component diagram including an Orchestrator IP 302 and the Safety Monitor 314 as disclosed herein. The Orchestrator IP may be located within a System on Chip 304 along with a debug infrastructure 306. The Orchestrator IP may be configured to perform one or more functional safety compliant self-tests on one or more IPs, depicted as 308, 310, and 312. The Orchestrator IP may be bi-directionally connected to the external Safety Monitor. The Orchestrator IP may orchestrate one or more safety-related IP self-tests by exploiting the legacy debug infrastructure by using TAP scripts. That is, one or more safety-related TAP scripts may be developed and securely stored, such that they direct the Orchestrator IP to perform one or more self-tests in accordance with one or more Functional Safety standards. The Orchestrator IP, the Safety Monitor, the TAP scrips, and/or the resulting self-tests that are performed may be developed and/or validated according to a desired Safety Integrity Level as defined by one or more Functional Safety Standards.

Figure 4:
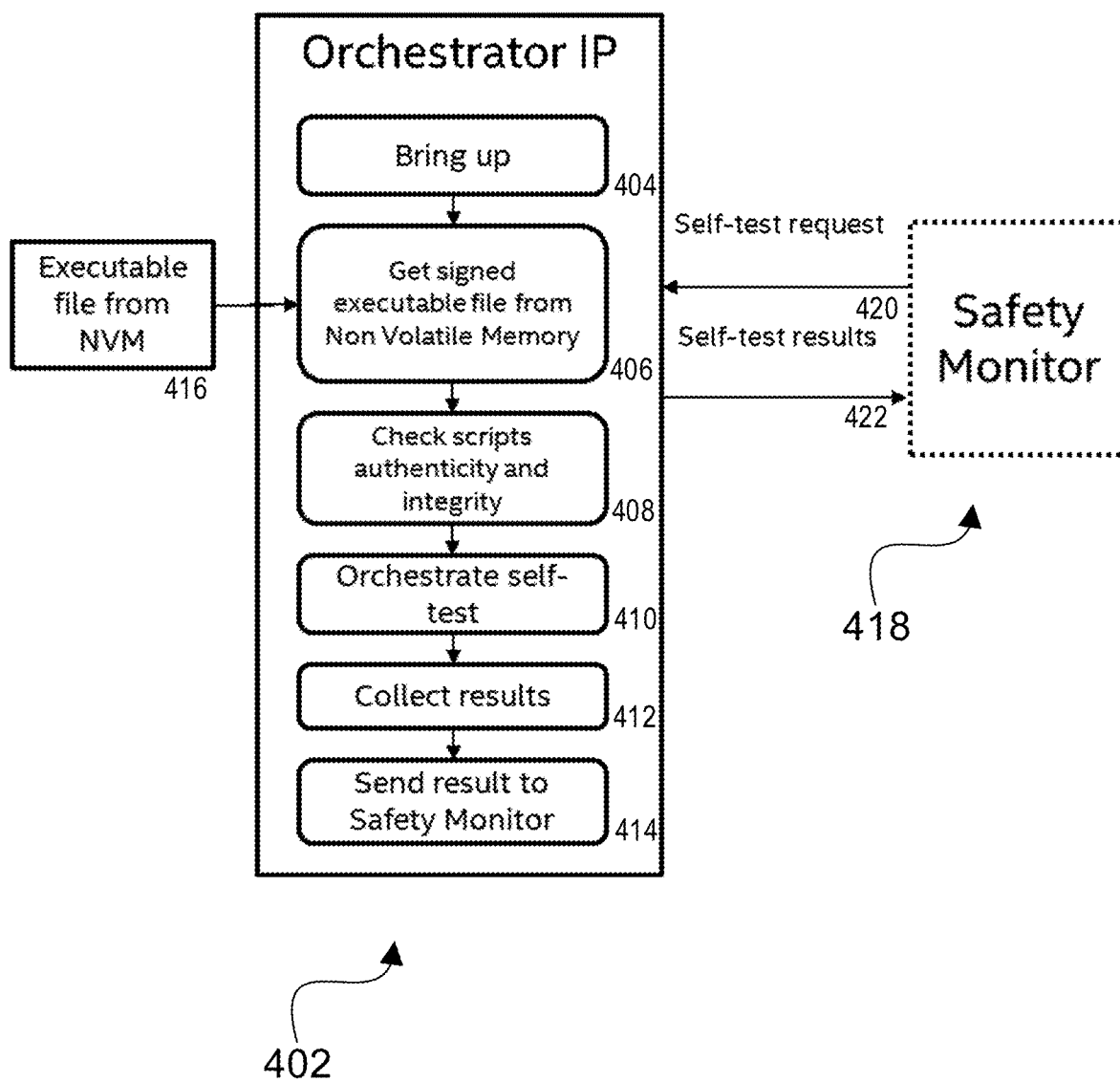
FIG. 4 depicts various steps that are executed by the Orchestrator IP with respect to the self-test orchestration.

FIG. 4 depicts various steps that the Orchestrator IP may execute with respect to the self-test orchestration. As in the previous figure, the Orchestrator IP 402 may be bi-directionally connected to the Safety Monitor 418, said bi-directional connection being depicted by 420 and 422.

The Safety Monitor may trigger the Orchestrator IP bring-up 404, the bring-up including any of powering-on one or more parts of a SOC; writing low-level test code to exercise memory and peripheral interfaces; ensuring that the bootloader can communicate with one or more boot devices; verifying a correct operation of a boot process; writing a driver that allows an initial boot image to be written to a blank boot device; and/or ensuring that one or more debugging mechanisms for application-level code are operating properly.

The Orchestrator IP may read one or more testing scripts 416, which may be configured as one or more executable files from non-volatile memory. The Orchestrator IP may be configured to check the one or more signed executable scripts for authenticity and integrity 408. Assuming that the one or more signed executable scripts are deemed sufficiently authentic and satisfy the integrity test, the Orchestrator IP may be configured to orchestrate (e.g. trigger or instruct one or more other components to perform) the one or more self-tests 410. The Orchestrator IP may be configured to receive the results of said one or more self-tests 412. The Orchestrator IP may be configured to send the results of the one or more self-tests to the safety Monitor 414, such as through the communication pathway 422. The TAP script 416 may be executed as a black box executable script. Of note, and to maintain integrity of the one or more self-tests, the Orchestrator IP may not be configured with any knowledge of the TAP script. As such, the Orchestrator IP is unable to manipulate collected results to achieve a false-positive outcome.

Figure 5:
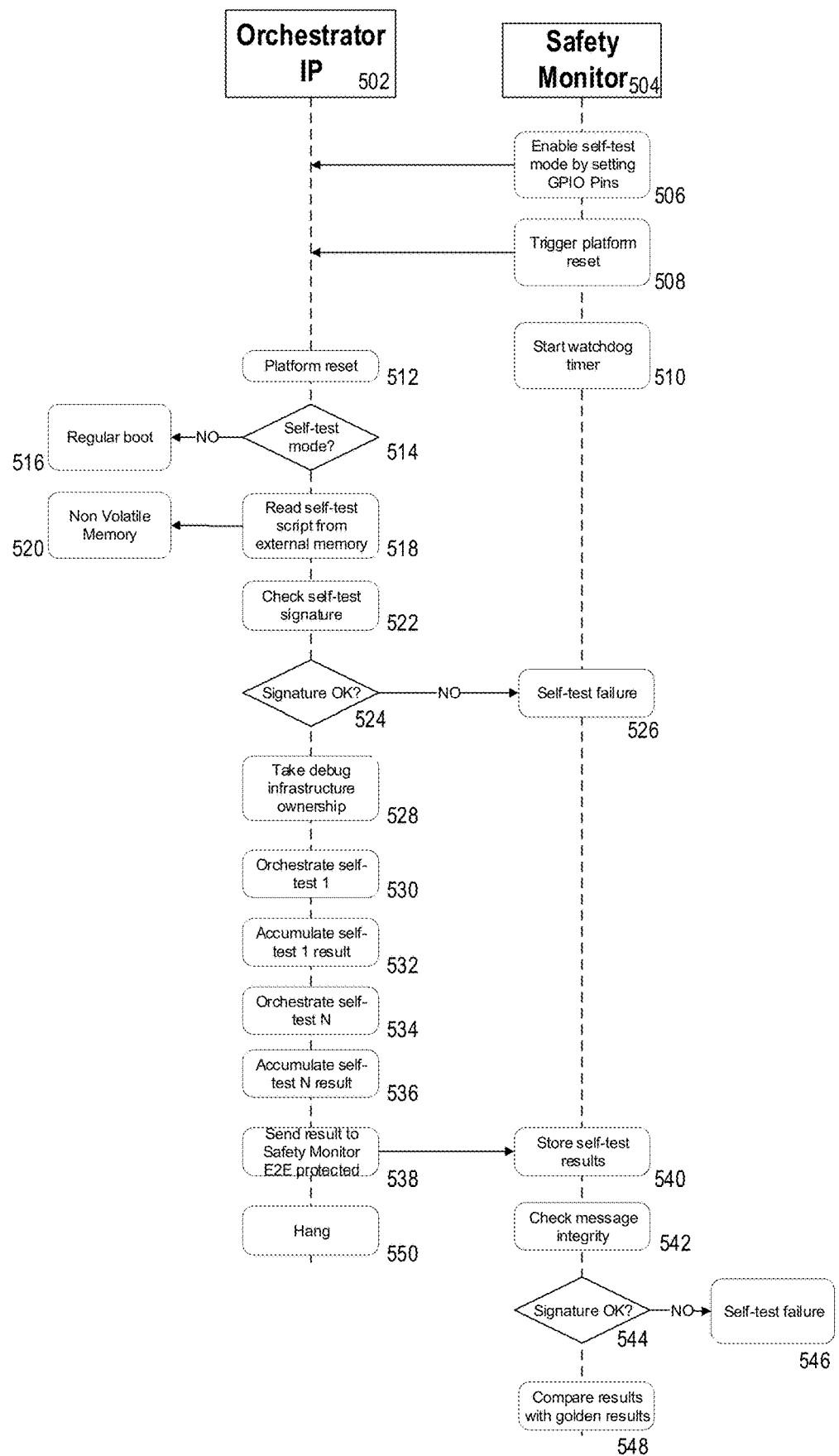
FIG. 5 depicts a detailed self-test flow with respect to the Orchestrator IP and the Safety Monitor.

FIG. 5 depicts detailed self-test flow with respect to the Orchestrator IP 502 and the Safety Monitor 504. The Safety Monitor 504 may enable the self-test mode by setting an input/out pin (e.g., a General Purpose Input/Output Pin (GPIO)) 506 (Functional Safety_EN_Self_Test). The Safety Monitor 504 may trigger a platform reset 508 and set a watchdog timer 510 to monitor the overall flow execution. If the results are not provided within a predefined time (e.g., a time corresponding to a duration of the watchdog timer), the Safety Monitor may consider the overall flow a failure.

The Orchestrator IP may perform a platform reset 512 in response to the reset trigger 508. After the platform reset 512, the Orchestrator IP FW 502 may determine whether the system is in self-test mode 514. If the self-test mode is not enabled, then the Orchestrator IP may conduct a regular boot 516. If self-test mode is enabled, then the Orchestrator IP may load the TAP script from an external memory 518 (e.g., flash memory or other non-volatile memory 520). The TAP script may be a signed TAP script, which may obviate one or more security concerns related to malicious scripts and/or protect the script from data corruption. After loading the TAP script, the Orchestrator IP may verify/check the TAP signature 522. If the signature does not pass the verification test, the Orchestrator IP may transmit this non-passing result to the safety Monitor 504, and the Safety Monitor may declare a self-test failure 526. Assuming that the signature passes the verification test, the Orchestrator IP may execute the script. That is, the Orchestrator IP may take the debug infrastructure ownership 528 and may execute the TAP script. Execution of the TAP script may involve orchestrating one or more self-tests and accumulating results of the one or more self-tests. As depicted herein, the Orchestrator IP may be configured to orchestrate a first self-test 530 and to receive one or more results of the first self-test 532. The Orchestrator IP may orchestrate additional self-tests 534 until the desired number of self-tests (depicted herein as n self-tests) are complete and the Orchestrator IP has received the results of the n self-tests 536. The Orchestrator IP may send the self-test results to the Safety Monitor through the E2E interface 538.

According to one aspect of the Disclosure, the E2E messages may be split in at least a header area and a payload. The header may include a command ID, a sender ID, a receiver ID, a message cyclic redundancy check, and/or one or more flags. The payload may include a test enabled mask and/or individual test results. For every message that arrives at the E2E interface, the Safety Monitor may check that the message is not corrupted by verifying the message CRC as well as the predefined fields 542. If the message is deemed reliable via the message integrity check 544, then the test enabled mask may be checked to ensure that all expected tests have been executed. The Safety Monitor may compare each received test result with an expected test result 548 (referred to as the "golden results"). Although the test results may be sent in any configuration, according to one aspect of the disclosure, the test results may include a sequence of bits of variable size. If all tests have run and all test results match the golden results, the Safety Monitor may return a pass result; otherwise the Safety Monitor may return a fail result.

From a methodology standpoint the principles and methods disclosed herein may be implemented using the following considerations:

(1) The Safety Requirements may be allocated to the Orchestrator IP firmware.

(2) The firmware portion of the Orchestrator IP that is responsible for the orchestration of the self-test may be identified.

(3) A freedom from interference (FFI) analysis between the legacy Orchestrator IP FW and the orchestration FW may be performed to prove that legacy firmware cannot interfere with the self-tests performed according to this disclosure. This may be guaranteed by the architecture disclosed herein, as the self-test related firmware may begin running before the legacy Orchestrator firmware.

(4) An FFI analysis between Orchestrator IP FW and Safety Monitor may not be required since, by definition, the Safety Monitor is an independent software/firmware/hardware IP compared to the rest of the software/firmware/hardware components involved in the self-test (5) A software failure mode effects analysis (FMEA) may be performed on the Orchestrator IP firmware. In this context, all failure modes that are above the relevant risk priority number (RPN) threshold may be collected (the RPN threshold depending on the system target automotive safety integrity level (ASIL)/safety integrity level (SIL).

(6) The Safety Monitor may have knowledge of the safety requirements and/or expected test results, any of which may be stored directly on the Safety Monitor, such that the Safety Monitor can receive self-test results from Orchestrator IP, compare the results received from the Orchestrator IP to the expected results, and make pass/fail decisions of the self-tests based on the comparison of the received results to the expected results.

(7) The software FMEA analysis may be updated according to any mitigation measures performed by the Safety Monitor.

Figure 6:
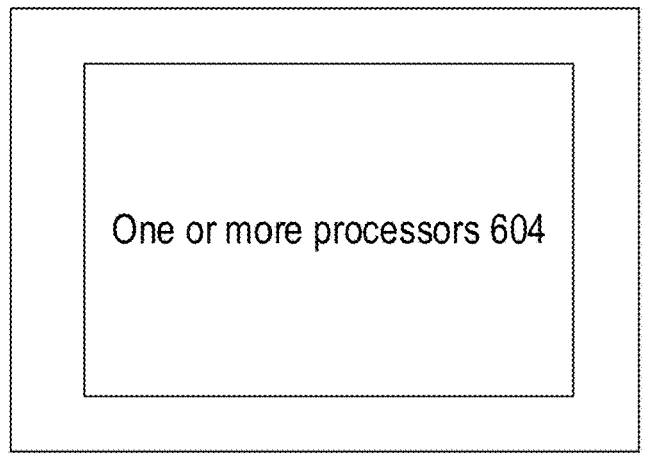
FIG. 6 depicts a self-test verification device, according to an aspect of the disclosure.

FIG. 6 shows a self-test verification device 602, according to an aspect of the disclosure. The self-test verification device 602 may include one or more first processors 604, configured to: generate an instruction for one or more second processors to perform one or more device self-tests; determine for a received result of the one or more device self-tests, whether the result fulfills a predetermined receive time criterion describing an acceptable time until the result should have been received; determine a difference between the received result and a target result; and if the predefined receive time criterion is fulfilled and if the difference between the received result and the target result is within a predetermined range, generate a signal representing a passed self-test.

Figure 7:
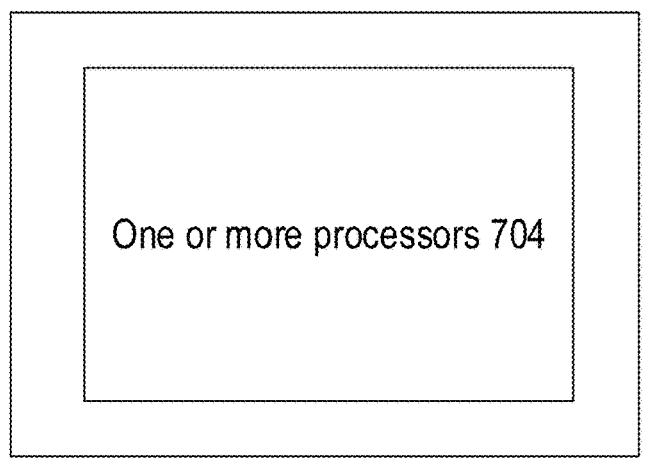
FIG. 7 depicts an orchestrator IP, according to an aspect of the disclosure.

FIG. 7 depicts an orchestrator IP 702, according to an aspect of the disclosure. The Orchestrator IP may include one or more first processors 704, configured to generate a signal representing a failed self-test if the predefined receive time criterion is not fulfilled.

FIG. 8 depicts a method of self-test verification including: generating an instruction for one or more second processors to perform one or more device self-tests 802; determining for a received result of the one or more device self-tests, whether the result fulfills a predefined receive time criterion describing an acceptable time until the result should have been received 804; determining a difference between the received result and a target result 806; and if the predefined receive time criterion is fulfilled and if the difference between the received result and the target result is within a predetermined range, generating a signal representing a passed self-test 808.

The one or more processors of the self-test verification device may be configured to compare a received test result (i.e. a test result received from the Orchestrator IP) with a target test result (a golden result or a reference passing result). The one or more processors of the self-test verification device may further be configured to determine a difference between the received test result and the target test result. The one or more processors may be configured to determine whether the difference is within a predetermined range, and if the difference is within a predetermined range, to deem the self-test as a passing self-test, and if the difference is outside of a predetermined range, to deem the self-test as a failing self-test.

The predetermined range may be any range whatsoever, without limitation. The predetermined range may for example be expressed in terms of a percent of deviation from a target result, a number of bits of deviation from a target result or otherwise. Alternatively, and the word "range" notwithstanding, the predetermined range can be expressed as a single point, identifying absolute uniformity with the target result. That is, the predetermined range may be configured such that a self-test result that is identical to a target result will be deemed to have passed, and a self-test result that is anything but identical to the target result will be deemed to have failed.

In the event that the self-test is deemed to have failed, the one or more processors of the Safety Monitor may be configured to generate a signal representing a failed self-test. The Safety Monitor may send the generated signal to any device, or may store data representing the failed self-test in a memory.

The Safety Monitor may further be configured to generate a self-test failure message if it receives notification of a failed data verification. As described above, the Orchestrator IP may be configured to read from a non-volatile memory one or more self-test instructions for performing self-test according to at least one Functional Safety Standard. The Orchestrator IP may be configured to determine the authenticity/veracity of the self-test instructions. The Orchestrator IP may perform this determination of authenticity/veracity using any conventional standard, without limitation. According to one aspect of the disclosure, the Orchestrator IP may perform this determination of authenticity/veracity using one or more CRCs. In this manner, the OIP may have access to an expected CRC results. Upon reading the self-test instructions from the nonvolatile memory, the Orchestrator IP may be configured to perform a CRC test on the retrieved self-test instructions. Assuming that the determined CRC matches the expected CRC, the stored self-test instructions as read by the OIP may be deemed to be verified. It is noted that this is merely one manner in which the verification process may occur, and other verification procedures may be employed, without limitation.

According to another aspect of the disclosure, the Safety Monitor may include a predefined receive time criterion, which may be understood as a maximum permitted duration to complete a test corresponding to a received result. That is, for any given self-test, it may be required that the self-test be completed within a predetermined time. The Safety Monitor may have access to this predetermined time, and the SM may be configured to ensure that any self-test is performed within a duration corresponding to the predetermined time. This may be relevant at least because one or more Functional Safety Standards may require that one or more self-tests be performed within a specific time duration. By ensuring that the safety monitor has access to the required time duration corresponding to the one or more Functional Safety Standards, the safety Monitor may ensure that the corresponding self-test be completed within the allotted time. In some configurations, the Orchestrator IP may deliver the test results, and an indication of the time required for the self-test, to the safety Monitor. Nevertheless, it may be desirable, or even required, for the safety monitor to perform an independent verification of the test duration. This can be achieved by the safety monitor having a timer that is configured to calculate a duration between instructing the Orchestrator IP to begin a self-test and receiving the self-test result. Should the duration of the self-test (whether directly measured or based on a difference between the ordering of the self-test and the receipt of the result of the self-test) be longer than the maximum permitted duration, the safety Monitor may deem the self-test result a failure. Under this circumstance, the self-test result may be deemed a failure even when the results of the self-test match the expected test results.

The Orchestrator IP may be connected to the Safety Monitor via an input/output interface. In some configurations, the input/output interface may be understood as a component of the Orchestrator IP and/or the Safety Monitor. The input/output interface has been described herein as a GPIO interface; however, the input/output interface may be any type of input/output interface capable of establishing a bidirectional communication between the Orchestrator IP and the Safety Monitor. The input/output interface may be general-purpose, dedicated purpose, proprietary, or otherwise. Furthermore, the Orchestrator IP may send one or more messages to the Safety Monitor (e.g., test results, verification determinations, etc.) using any interface, without limitation. According to one aspect of the disclosure, the Orchestrator IP may send the one or more messages to the Safety Monitor via an Inter-Integrated Circuit (I2C) connection, although a variety of conventional connections may be used, and this should not be understood as limiting. The Orchestrator IP and the Safety Monitor may be configured to conduct end-to-end encrypted communication over the input/output interface.

According to an aspect of the disclosure, the Safety Monitor may include one or more storage media, on which any one or more of the target result, the predefined receive time criterion, and/or the predetermined range may be stored. The one or more storage media may be housed on a chip (e.g. a system on chip) with the Safety Monitor, or may be housed separate from the Safety Monitor in such a manner that the Safety Monitor may access data stored on the one or more storage media.

The Orchestrator IP may be configured to perform one or more authentication functions on store data. For example, the Orchestrator IP may be configured to read a self-test script from an external nonvolatile memory and determine an authenticity of the stored self-test script. As stated above, the Orchestrator IP may perform this verification using any conventional method, without limitation. If the Orchestrator IP determines that the authenticity of the stored self-test script does not satisfy a predetermined authenticity requirement (e.g. the stored self-test script is not sufficiently authentic based on a predetermined requirement), the Orchestrator IP may be configured to generate a message representing an authentication failure. The predetermined authenticity requirement may be configured as any requirement whatsoever, without limitation. According to one aspect of the disclosure, the predetermined authenticity requirement may be identity of a CRC and an expected CRC corresponding to the self-test script. According to an aspect of the disclosure, and in the event of an authentication failure of the self-test script, the Orchestrator IP may be configured to send the Safety Monitor one or more messages representing the failed authentication.

The Orchestrator IP may be configured with a memory on which the Orchestrator IP may store the read-out self-test instruction and/or the self-test results. This memory may be configured as part of a system on chip including the Orchestrator IP, or in any other configuration desired.

According to another aspect of the disclosure, the Orchestrator IP and the Safety Monitor may be configured as a self-test verification system. Said self-test verification system may include one or more first processors, configured to: generate an instruction for one or more second processors to perform one or more device self-tests; determine for a received result of the one or more device self-tests, whether the result fulfills a redefined receive time criterion describing an acceptable time until the result should have been received; determine a difference between the received result and a target result; and if the predefined receive time criterion is fulfilled and if the difference between the received result and the target result is within a predetermined range, generate a signal representing a passed self-test; and one or more second processors, configured to: receive from the one or more first processors the instruction to perform the one or more device self-tests; determine an authenticity of a stored self-test instruction as a result of having received the instruction to perform the one or more device self-tests; and if the determined authenticity satisfies a predetermined authenticity requirement, initiate one or more self-tests according to the verified self-test instruction; and generate and send to the one or more first processors a message including results of the one or more self-tests.

The Orchestrator IP and the Safety Monitor may each include one or more processors which are configured to perform the steps described herein. Each of these one or more processors may perform said steps based on one or more computer readable instructions which may be stored on one or more non-transitory computer readable media.

In the following Examples, various aspects of the present disclosure will be illustrated:

In Example 1, a self-test verification device including: one or more first processors, configured to: generate an instruction for one or more second processors to perform one or more device self-tests; determine for a received result of the one or more device self-tests, whether the result fulfills a predetermined receive time criterion describing an acceptable time until the result should have been received; determine a difference between the received result and a target result; and if the predefined receive time criterion is fulfilled and if the difference between the received result and the target result is within a predetermined range, generate a signal representing a passed self-test.

In Example 2, the self-test verification device of Example 1, wherein the one or more first processors are further configured to generate a signal representing a failed self-test if the predefined receive time criterion is not fulfilled.

In Example 3, the self-test verification device of Example 1 or 2, wherein the one or more first processors are further configured to generate a signal representing a failed self-test if the difference between the received result and the target result is outside of the predetermined range.

In Example 4, the self-test verification device of any one of Examples 1 to 3, wherein the one or more first processors are further configured to generate a signal representing a failed self-test if a received data verification message from the one or more second processors represents a failed data verification.

In Example 5, the self-test verification device of any one of Examples 1 to 4, wherein the predefined receive time criterion is a maximum permitted duration to complete a test corresponding to the received result.

In Example 6, the self-test verification device of any one of Examples 1 to 5, wherein the predetermined range requires identity of the received result and the target result.

In Example 7, the self-test verification device of any one of Examples 1 to 6, wherein the predetermined range defines a degree of permissible variation between the received result and the target result.

In Example 8, the self-test verification device of any one of Examples 1 to 7, wherein the one or more first processors are further configured to verify the received message data.

In Example 9, the self-test verification device of Example 8, wherein the one or more first processors are further configured to verify the received message data by performing a cyclic redundancy check.

In Example 10, the self-test verification device of any one of Examples 1 to 9, further including an input/output interface; wherein the one or more first processors are connected to the one or more second processors via the input/output interface.

In Example 11, the self-test verification device of Example 10, wherein the one or more first processors are configured to send the instruction to the one or more second processors via the input/output interface.

In Example 12, the self-test verification device of Example 10 or 11, wherein the one or more first processors are configured to receive the result from the one or more second processors via the input/output interface.

In Example 13, the self-test verification device of any one of Examples 10 to 12, wherein receiving the result from the one or more second processors includes receiving via the input/output interface using an end-to-end encryption method.

In Example 14, the self-test verification device of any one of Examples 1 to 13, further including a memory on which any one or more of the target result, the predefined receive time criterion, and the predetermined range is stored.

In Example 15, the self-test verification device of any one of Examples 1 to 14, wherein the predefined receive time criterion is a maximum test duration permitted by a Functional Safety Standard.

In Example 16, a self-test device including one or more second processors, configured to: determine an authenticity of a stored self-test instruction; and if the determined authenticity satisfies a predetermined authenticity requirement, initiate one or more self-tests according to the verified self-test instruction; and generate a message including results of the one or more self-tests.

In Example 17, the self-test device of Example 16, wherein the one or more second processors are further configured to generate a message representing an authentication failure if the determined authenticity does not satisfy the predetermined authenticity requirement.

In Example 18, the self-test device of Example 16 or 17, wherein the one or more second processors are further configured to send to the one or more first processors the message including results of the one or more self-tests or the message representing the authentication failure.

In Example 19, the self-test device of any one of Examples 16 to 18, further including an input/output interface; wherein the one or more second processors are connected to one or more first processors via the input/output interface.

In Example 20, the self-test device of Example 19, wherein the one or more first processors are configured to send the message including results of the one or more self-tests to the one or more second processors via the input/output interface.

In Example 21, the self-test device of Examples 19 or 20, wherein the one or more second processors are configured to receive an instruction for the one or more second processors to perform one or more device self-tests via the input/output interface, and wherein the one or more second processors are further configured to initiate the one or more self-tests only if the one or more second processors have received the instruction for the one or more second processors.

In Example 22, the self-test device of any one of Examples 20 to 21, wherein sending the message including results of the one or more self-tests includes sending the message via the input/output interface using an end-to-end encryption method.

In Example 23, the self-test device of any one of Examples 16 to 22, wherein the one or more second processors are configured to send a message representing the authenticity of a stored self-test instruction to the one or more first processors.

In Example 24, the self-test device of any one of Examples 16 to 23, wherein the one or more second processors are configured to send the message including results of the one or more self-tests to the one or more first processors via the input/output interface using an end-to-end encryption method.

In Example 25, the self-test device of any one of Examples 16 to 24, further including a memory configured to store the self-test instruction, wherein the one or more second processors are configured to read the self-test instruction from the memory.

In Example 26, a self-test verification system including: one or more first processors, configured to: generate an instruction for one or more second processors to perform one or more device self-tests; determine for a received result of the one or more device self-tests, whether the result fulfills a predefined receive time criterion describing an acceptable time until the result should have been received; determine a difference between the received result and a target result; and if the predefined receive time criterion is fulfilled and if the difference between the received result and the target result is within a predetermined range, generate a signal representing a passed self-test; and one or more second processors, configured to: receive from the one or more first processors the instruction to perform the one or more device self-tests; determine an authenticity of a stored self-test instruction as a result of having received the instruction to perform the one or more device self-tests; and if the determined authenticity satisfies a predetermined authenticity requirement, initiate one or more self-tests according to the verified self-test instruction; and generate and send to the one or more first processors a message including results of the one or more self-tests.

In Example 27, the self-test verification device of Example 26, wherein the one or more first processors are further configured to generate a signal representing a failed self-test if the predefined receive time criterion is not fulfilled.

In Example 28, the self-test verification system of Example 26 or 27, wherein the one or more first processors are further configured to generate and send a signal representing a failed self-test if the difference between the received result and the target result is outside the second range.

In Example 29, the self-test verification system of any one of Examples 26 to 28, wherein the predetermined range requires identity of received result and the target result.

In Example 30, the self-test verification system of any one of Examples 26 to 29, wherein the predetermined range permits a predetermined variance between the received result and the target result.

In Example 31, the self-test verification system of any one of Examples 26 to 30, wherein the received time criterion is a maximum permitted duration to complete a test corresponding to the received result.

In Example 32, the self-test verification system of any one of Examples 26 to 31, wherein the one or more first processors are further configured to generate a signal representing a failed self-test if a received data verification message from the one or more second processors represents a failed data verification.

In Example 33, the self-test verification system of any one of Examples 26 to 32, wherein the one or more first processors are further configured to verify the received message data.

In Example 34, the self-test verification system of Example 33, wherein the one or more first processors are further configured to verify the received message data by performing a cyclic redundancy check.

In Example 35, the self-test verification system of any one of Examples 26 to 34, further including an input/output interface; wherein the one or more first processors are connected to the one or more second processors via the input/output interface.

In Example 36, the self-test verification system of Example 35, wherein the one or more first processors are configured to send the instruction to the one or more second processors via the input/output interface.

In Example 37, the self-test verification system of Example 35 or 36, wherein the one or more first processors are configured to receive the result from the one or more second processors via the input/output interface.

In Example 38, the self-test verification system of any one of Examples 35 to 37, wherein receiving the result from the one or more second processors includes receiving via the input/output interface using an end-to-end encryption method.

In Example 39, the self-test verification system of any one of Examples 26 to 38, further including a memory on which any one or more of the target result, the predefined receive time criterion, and the predetermined range is stored.

In Example 40, the self-test verification system of any one of Examples 26 to 39, wherein the predefined receive time criterion is a maximum test duration permitted by a Functional Safety Standard.

In Example 41, a method of self-test verification including: generating an instruction for one or more second processors to perform one or more device self-tests; determining for a received result of the one or more device self-tests, whether the result fulfills a predefined receive time criterion describing an acceptable time until the result should have been received; determining a difference between the received result and a target result; and if the predefined receive time criterion is fulfilled and if the difference between the received result and the target result is within a predetermined range, generating a signal representing a passed self-test.

In Example 42, the method of self-test verification of Example 41, wherein the one or more first processors are further configured to generate a signal representing a failed self-test if the predefined receive time criterion is not fulfilled.

In Example 43, the method of self-test verification of Example 41 or 42, further including generating a signal representing a failed self-test if the distance between the received result and the target result is outside the predetermined range.

In Example 44, the method of self-test verification of any one of Example 41 or 43, wherein the predetermined range requires identity of received result and the target result.

In Example 45, the method of self-test verification of any one of Examples 41 to 44, wherein the predetermined range permits a predetermined variance between the received result and the target result.

In Example 46, the method of self-test verification of any one of Examples 41 to 45, wherein the predefined receive time criterion is a maximum permitted duration to complete a test corresponding to the received result.

In Example 47, the method of self-test verification of any one of Examples 41 to 46, further including generating a signal representing a failed self-test if a received data verification message from the one or more second processors represents a failed data verification.

In Example 48, the method of self-test verification of any one of Examples 41 to 47, further including to verifying the received message data.

In Example 49, the method of self-test verification of Example 48, further including verifying the received message data by performing a cyclic redundancy check.

In Example 50, the method of self-test verification of Example 41 to 49, further including sending the instruction from the one or more first processors to the one or more second processors via an input/output interface.

In Example 51, the method of self-test verification of Example 41 to 50, further including the one or more first processors receiving the result from the one or more second processors via an input/output interface.

In Example 52, the method of self-test verification of any one of Examples 41 to 51, wherein receiving the result from the one or more second processors includes receiving the result via an input/output interface using an end-to-end encryption method.

In Example 53, the method of self-test verification of any one of Examples 41 to 52, wherein any one or more of the target result, the predefined receive time criterion, and the predetermined range are stored on a memory.

In Example 54, the method of self-test verification of any one of Examples 41 to 53, wherein the predefined receive time criterion is a maximum test duration permitted by a Functional Safety Standard.

In Example 55, one or more non-transitory computer readable media including instructions, which when executed by one or more processors cause the one or more processors to perform the steps of any one of method Examples 41 to 54.

In Example 56, the self-test verification device of any one of claims 1 to 15, wherein a self-test capability of the self-test verification device is compliant with one or more Functional Safety standards.

In Example 57, the self-test verification system of any one of claims 26 to 40, wherein a self-test capability of the self-test verification system is compliant with one or more Functional Safety standards.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A self-test verification device comprising:
   one or more first processors, electrically conductively connected to one or more second processors, and configured to:
   generate an instruction for the one or more second processors to perform a device self-test;
   receive from the one or more second processors a signal representing a result of the device self-test;
   determine for the received result of the device self-test, and based on an arrival time of the received result, whether the result fulfills a receive-time-criterion, wherein the receive-time-criterion is a maximum permitted duration to complete the device self-test;
   determine a difference between the received result and a target result; and
   if the result fulfills the receive-time-criterion and if the difference between the received result and the target result is within a predetermined range, generate a signal representing a passed self-test.

2. The self-test verification device of claim 1, wherein the one or more first processors are further configured to generate a signal representing a failed self-test if the receive-time-criterion is not fulfilled.

3. The self-test verification device of claim 1, wherein the one or more first processors are further configured to generate a signal representing a failed self-test if the difference between the received result and the target result is outside of the predetermined range.

4. The self-test verification device of claim 1, wherein the one or more first processors are further configured to generate a signal representing a failed self-test if a received data verification message from the one or more second processors represents a failed data verification.

5. The self-test verification device of claim 1, wherein the receive-time-criterion is a maximum permitted duration to complete the device self-test.

6. The self-test verification device of claim 1, wherein the predetermined range requires identity of the received result and the target result.

7. The self-test verification device of claim 1, wherein the predetermined range defines a degree of permissible variation between the received result and the target result.

8. The self-test verification device of claim 1, wherein the one or more first processors are further configured to verify the signal.

9. The self-test verification device of claim 8, wherein the one or more first processors are further configured to verify the signal by performing a cyclic redundancy check.

10. The self-test verification device of claim 1, further comprising an input/output interface; wherein the one or more first processors are connected to the one or more second processors via the input/output interface.

11. The self-test verification device of claim 10, wherein the one or more first processors are configured to send the instruction to the one or more second processors via the input/output interface.

12. The self-test verification device of claim 10, wherein the one or more first processors are configured to receive the result from the one or more second processors via the input/output interface.

13. The self-test verification device of claim 10, wherein receiving the signal representing the result of the device self-test comprises receiving the signal via the input/output interface using an end-to-end encryption method.

14. The self-test verification device of claim 1, further comprising a memory on which any one or more of the target result, the receive-time-criterion, and the predetermined range is stored.

15. The self-test verification device of claim 1, wherein the receive-time-criterion is a maximum test duration permitted by a Functional Safety Standard.

16. A self-test device comprising one or more processors, configured to:
   determine an authenticity of a stored self-test instruction; and
   if the determined authenticity satisfies a predetermined authenticity requirement, initiate one or more self-tests according to the verified self-test instruction; and generate a message comprising results of the one or more self-tests.

17. The self-test device of claim 16, wherein the one or more processors are further configured to generate a message representing an authentication failure if the determined authenticity does not satisfy the predetermined authenticity requirement.

18. A self-test verification system comprising:
   one or more first processors, electrically conductively connected to one or more second processors, and configured to:
      generate an instruction for the one or more second processors to perform a device self-test;
      receive from the one or more second processors a signal representing a result of the device self-test;
      determine for the received result of the device self-test, and
      based on an arrival time of the received result, whether the result fulfills a receive-time-criterion, wherein the receive-time-criterion is a maximum permitted duration to complete the device self-test;
      determine a difference between the received result and a target result; and
      if the result fulfills the receive-time-criterion and if the difference between the received result and the target result is within a predetermined range, generate a signal representing a passed self-test; and
   the one or more second processors, configured to:
      receive from the one or more first processors the instruction to perform the device self-test;
      determine an authenticity of a stored self-test instruction as a result of having received the instruction to perform the device self-test; and
      if the determined authenticity satisfies a predetermined authenticity requirement, initiate the self-test according to the self-test instruction;
      and generate and send to the one or more first processors the signal representing the result of the self-test.

19. The self-test verification system of claim 18, wherein the one or more first processors are further configured to generate a signal representing a failed self-test if the predefined receive time criterion is not fulfilled.

20. One or more non-transitory computer readable media comprising instructions, which when executed by one or more processors cause the one or more processors to generate an instruction for one or more second processors to perform a device self-test;
   determine for a result of the device self-test received from the one or more second processors, and based on an arrival time of the received result, whether the received result fulfills a receive-time-criterion, wherein the receive-time-criterion is a maximum permitted duration to complete the device self-test;
   determine a difference between the received result and a target result; and
   if the receive-time-criterion is fulfilled and if the difference between the received result and the target result is within a predetermined range, generate a signal representing a passed self-test.

21. The one or more non-transitory computer readable media of claim 20, wherein the predefined receive time criterion is a maximum permitted duration to complete a test corresponding to the received result.

\* \* \* \* \*